Figure 1:
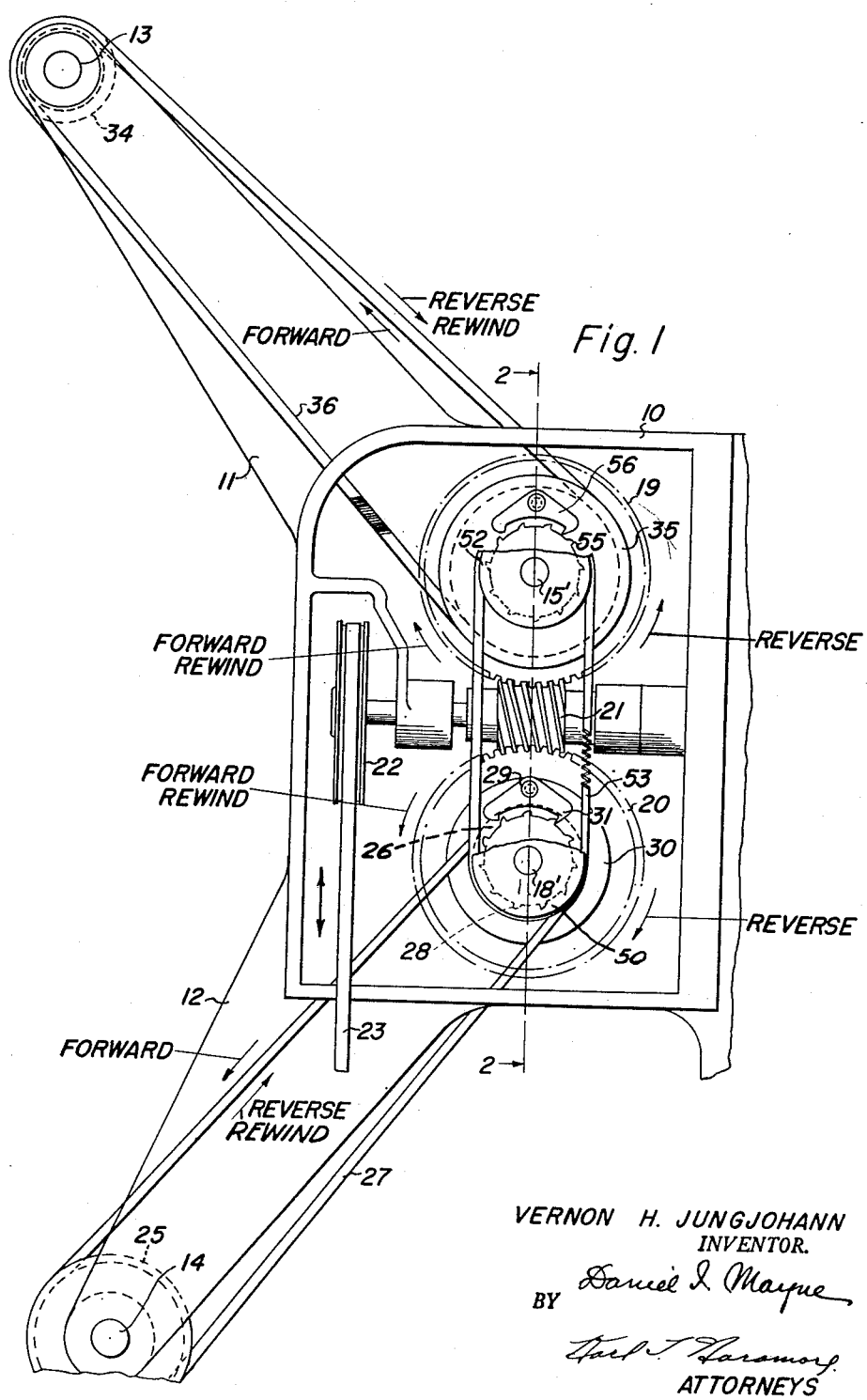

Jan. 19, 1954 V. H. JUNGJOHANN 2,666,594
REEL DRIVING MECHANISM FOR MOTION-PICTURE PROJECTORS
Filed April 1, 1952 3 Sheets-Sheet 1

VERNON H. JUNGJOHANN
INVENTOR.

BY
ATTORNEYS

Jan. 19, 1954
V. H. JUNGJOHANN
2,666,594
REEL DRIVING MECHANISM FOR MOTION-PICTURE PROJECTORS
Filed April 1, 1952
3 Sheets-Sheet 2
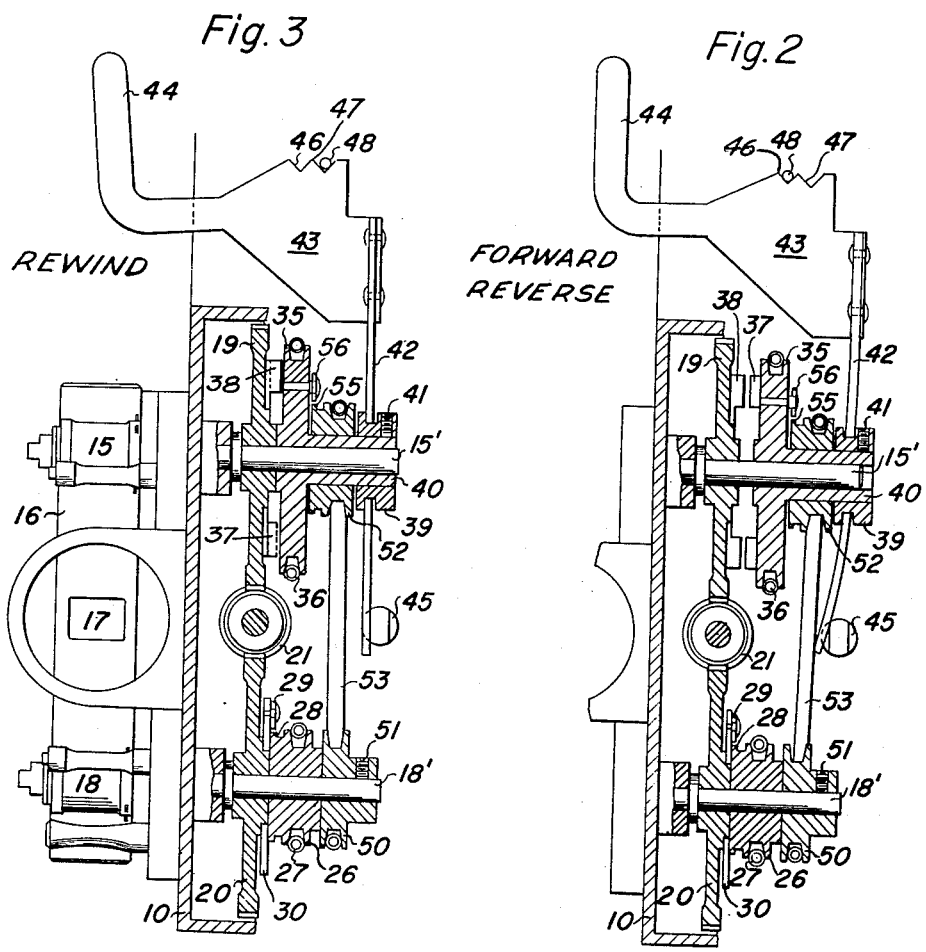
VERNON H. JUNGJOHANN
INVENTOR.
BY
ATTORNEYS

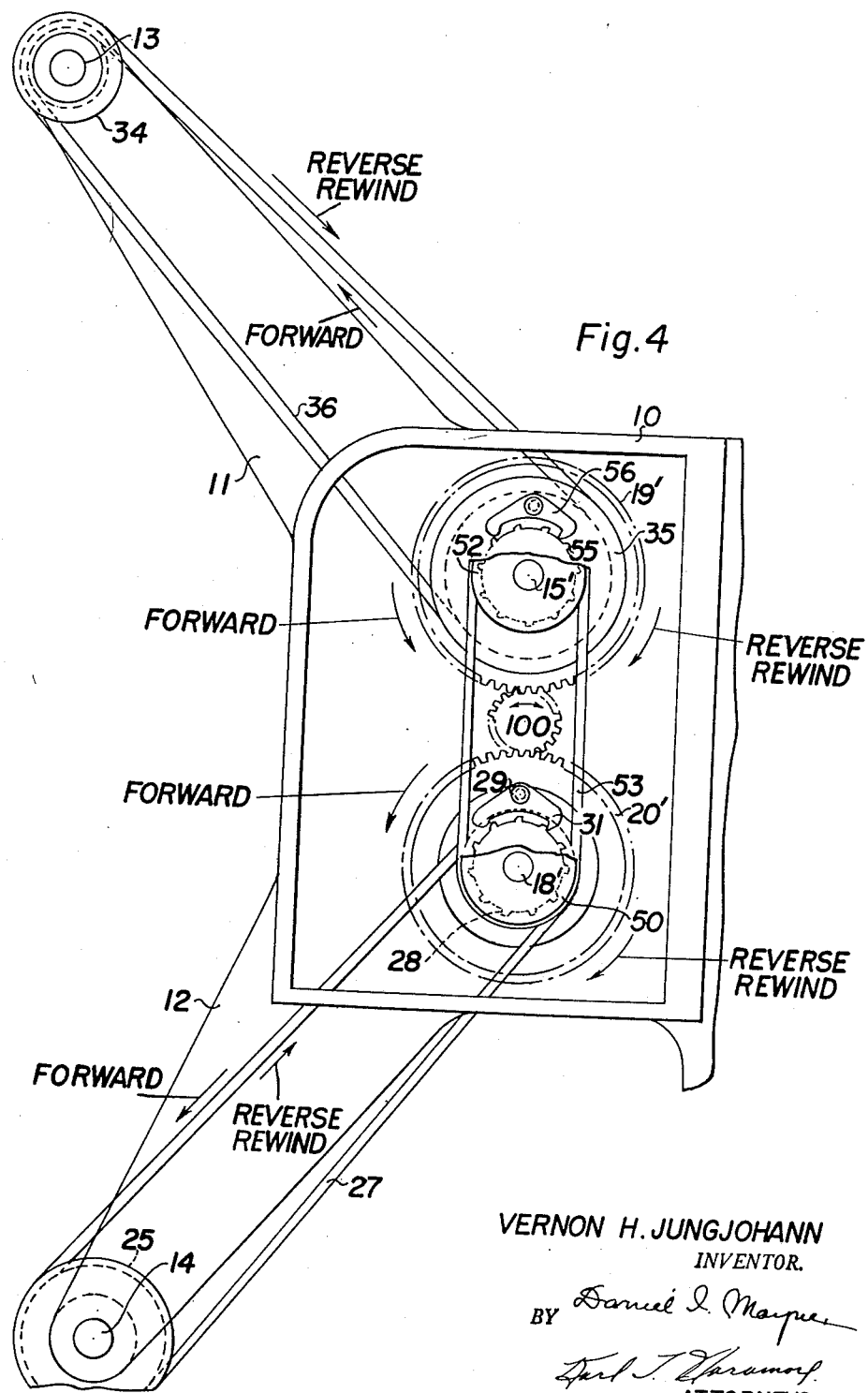

Patented Jan. 19, 1954

2,666,594

UNITED STATES PATENT OFFICE 2,666,594

REEL DRIVING MECHANISM FOR MOTION-PICTURE PROJECTORS

Vernon H. Jungjohann, Rochester, N. Y., assignor to Eastman Kodak Company, Rochester, N. Y., a corporation of New Jersey Application April 1, 1952, Serial No. 279,797

10 Claims. (Cl. 242—55)

This invention relates to motion picture projectors, and particularly to a mechanism for selectively driving the supply and take-up spindles for take-up, rewinding, and reversing purposes.

One of the problems in a motion picture projector capable of reverse operation, as well as the customary forward and rewind operations, is the application of the proper driving torques to the supply spindle. The rewind torque should be greater than that supplied for reverse projection because the rewind of the film, in order to be most satisfactory, should be at a much higher speed than the feed of the film during reverse projection, which is the same as forward projection, i. e., 16 frames per second for silent pictures and 24 frames per second for sound films. Furthermore, the rewinding of the film is generally carried on against some drag placed on the take-up spindle in order to insure the film being wound tightly on the supply reel. During reverse projection, on the other hand, the driving torque applied to the supply spindle should not be so great as to tend to pull the film strip from the film sprocket faster than the sprocket feeds it to the extent that a rupturing tension is applied to the film strip at this point.

The objects of the present invention are to provide a driving mechanism for the supply and take-up spindles of a motion picture projector which will permit selective take-up, reverse and rewind operation without the necessity of changing the film reels from one spindle to the other, without necessitating the changing or replacement of driving belts but requiring only the manual operation of a shift lever and/or the manual operation of a reversing lever; a driving mechanism which automatically supplies two different driving torques to the supply spindle, one for reverse operation and one for rewind operation; a driving mechanism in which the normal forward or take-up drive is maintained on the take-up spindle during rewind operation to provide the necessary drag on the film strip for a tightly rewound supply reel; and to provide a driving mechanism which, while relatively simple and inexpensive in construction, is foolproof in operation.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which, Fig. 1 is a side elevational view of the driving mechanism of a motion picture projector constructed in accordance with a preferred embodiment of the present invention, and specifically showing the driving connections for the supply and take-up spindles, Fig. 2 is a sectional view taken substantially on line 2—2 of Fig. 1 and showing the shifting mechanism in position to produce either a take-up or reverse operation depending upon which direction the prime mover is operated, Fig. 3 is a view similar to Fig. 2, but showing the shifting mechanism in position to drive the supply spindle for rewind operation, Fig. 4 is a view similar to Fig. 1 and showing another embodiment of the present invention wherein the driven members and film sprockets are driven in the same direction rather than in counter directions.

Generally speaking, the present driving mechanism for the take-up and supply spindles of a motion picture projector comprises a pair of reversible driver members adapted to be simultaneously rotated in either counter directions or the same direction and in one sense for take-up and rewind operation or take-up operation alone, and in the opposite sense for reverse operation alone or for reverse and rewind operation, respectively. A tendency or slip drive is provided for driving the take-up spindle and is adapted to be connected to one of said drivers during rewind and take-up operation, and disconnected therefrom during reverse operation, by virtue of a one-way clutch between said slip drive and its driver. An independent tendency or slip drive is provided for driving the supply spindle for rewind operation. A manually operated clutch between this last mentioned tendency drive and the other driver permits this drive to be positively connected to said other driver for rewind purposes or disconnected therefrom for take-up and reverse operation. This tendency drive for the supply spindle is designed to produce a greater driving torque on the supply spindle than the other tendency drive places on the take-up spindle because during rewind the drive to the take-up spindle is maintained to produce a drag on the rewind so as to obtain a tight rewound reel of film. In order to provide a reverse driving torque on the supply spindle for reverse operation which is less than the rewind torque an auxiliary tendency drive is provided for driving the tendency drive directly connected to the supply spindle. This auxiliary tendency drive is designed so as to have a driving torque commensurate with the feeding of the film during reverse projection and so that it will slip should the supply reel tend to pull film from the feeding sprocket too much faster than the sprocket tends to feed it to the reel. This auxiliary drive is driven from the driver with which the take-up spindle drive is associated, and a one-way clutch between a driven member of an auxiliary drive and the tendency drive for the supply spindle automatically connects the two together when the drivers are rotating in the proper sense for reverse operation. Under this condition the auxiliary tendency drive becomes the power source for driving the tendency drive directly connected to the supply spindle whereby the driving torque to which the supply spindle is subjected is that of which the auxiliary drive is capable of producing rather than that which the tendency drive directly connected to the spindle is capable of producing.

The mechanism for selectively driving the supply and take-up spindles of a motion picture projector according to the present invention is adaptable for use with a projector having varied types of film paths and mechanisms for feeding the film strip to, from and through the gate, as will be apparent from the following description. For the purpose of disclosing the invention I have chosen to show it in combination with a projector including a mechanism housing 10 from the upper and lower corners of which extend reel arms 11 and 12, respectively, see Fig. 1. Rotatably mounted on the upper end of reel arm 11 is a supply spindle 13 on which a supply reel of film, not shown, is adapted to be mounted. As is well known, this reel spindle 13 may have any suitable form of hold back mechanism associated therewith to keep the film from running off the reel freely as it is pulled forwardly by the film advancing sprockets. Rotatably mounted on the end of the lower reel arm 12 is a take-up spindle 14 on which a take-up reel (not shown) is adapted to be mounted for take-up purposes.

In accordance with conventional procedure, film from the supply reel is threaded over a constantly-driven sprocket 15, through a film gate 16 and past a projection aperture 17, thence over another constantly-driven sprocket 18 and to the take-up reel on spindle 14. The upper film sprocket 15 serves to draw the film from the supply reel and feed it to a loop in advance of the film gate and from which loop the film is pulled and fed past the projection aperture by an intermittent feeding mechanism of any suitable type (not shown). The lower sprocket 18 pulls the film from a loop following the film gate and feeds it to the take-up reel on spindle 14. In the projector shown, the two film sprockets 15 and 18 are constantly driven by driver members in the form of worm wheels 19 and 20, fixed to sprocket shafts 15' and 18', respectively, which each engage and are simultaneously driven in counter directions by a worm 21. This worm 21 is adapted to be driven in both directions by a reversible drive including pulley 22 and belt 23 which may be connected to the pulley of a reversible electric motor, not shown. For forward projection and rewind operation the worm wheels 19 and 20 are driven in the same sense while for reverse projection they are driven in the opposite sense, as indicated by the legends on the directional arrows on Fig. 1. Reversing the sense of the drive on the worm wheels can be accomplished by reversing the motor driving belt 23, by crossing belt 23 or by any other suitable change in the drive for pulley 22. Although in this embodiment I have shown the invention in combination with a projector having a conventional film path, see U. S. Patent 2,172,235, wherein the film passes over the top of both sprockets 15 and 18 and hence require the drivers 19 and 20 to be simultaneously rotated in counter directions, my invention will work just as well in combination with projectors in which the film passes under sprocket 15 and over sprocket 18, see U. S. Patents 1,509,256 and 2,000,286, and in which case the drivers 19 and 20 will be rotated in the same direction, as will be pointed out hereinafter.

The mechanism described up to this point constitutes no part of the present invention except in so far as it acts in combination with the spindle driving mechanism now to be described and constituting the present invention. In fact, the present invention is not limited to a driving mechanism in which the driver members are worm wheels driven by a worm which is capable of being driven in opposite directions. So far as the present invention is concerned all that is necessary is that there be two driver members capable of being simultaneously rotated in one of two directions and having their sense of direction selectively reversible. Equivalent driving mechanism for that already disclosed would include two drivers in the form of two spur gears or two friction discs simultaneously driven in counter directions by a selectively reversible pair of pinions or small friction discs, respectively. Furthermore, the driver members could be entirely independent of one another and each have separate reversible motor drives arranged to normally rotate the drivers in counter directions and having their reversing switches interconnected so that they would both be reversed upon the manipulation of a single switch or other member.

Coming now to the present invention, a tendency or slip drive is provided for driving the take-up spindle which will drive the take-up reel in a take-up direction during both forward and rewind operation of the projector and allow it to run freely in an unwinding direction during reverse operation. A slip drive for the take-up spindle is desirable to accommodate for the increase in size of the reel of film as projection proceeds and in the present arrangement permits the drive on the take-up reel to provide a satisfactory drag on the film during rewind in order to insure a tightly rewound reel of film. To this end the drive for the take-up spindle 14 may comprise a pulley 25 fixed to the spindle, a pulley 26 rotatably mounted on the sprocket shaft 18' and a belt 27 connecting the two. The driving torque applied to this take-up spindle by this belt drive should be sufficient to pull the film from sprocket 18 during forward operation.

A one-way clutch is provided between pulley 26 and driver 20 to insure the take-up spindle being driven in the take-up direction when the projector is set for either forward or rewind operation and being left for free rotation during reverse operation. One form of one-way clutch which is particularly adaptable to the drive arrangement disclosed is a pawl and ratchet clutch of the type shown as consisting of a ratchet 28 formed on the periphery of a flange on the pulley 26 and adapted to be engaged by a double-ended pawl 29 loosely pivoted on a disk 30 fixed to the hub of the driver or worm wheel 20. Looking at Fig. 1 it will be observed that when the driver 20 is rotating in a counter clockwise direction for forward and rewind operation of the projector the pawl 29 will be rotated therewith relative to ratchet 28 and the sharp tooth 31 of the pawl will engage the ratchet to rotate pulley 26 counter clockwise and drive the take-up spindle 14 in a take-up or forward direction. When the driver 20 is rotated clockwise for reverse operation of the projector the pawl 29 will ride over ratchet 28 so that the take-up spindle will not be driven but will be free to rotate as sprocket 18 pulls the film off thereof. It will thus be seen that whether or not the take-up spindle 14 is driven depends upon whether the projector is set for forward, rewind or reverse operation.

Considering now the drive for the supply spindle, it is necessary that the drive for this spindle be cut out during forward operation of the projector and that it be driven at a relatively high speed and relatively high torque during rewind. The high speed is desirable to cut down the time required for rewinding the film strip and the relatively high rewind torque is required since it must overcome the take-up torque on spindle 14 which is used in this instance as a rewind drag. To this end I provide a tendency or slip drive for supply spindle 13 which comprises a pulley 34 fixed to the supply spindle, a relatively large pulley 35 rotatably mounted on sprocket shaft 15' and a resilient spring belt 36 connecting the two. The pulley 35 is larger than pulley 34 to step up the speed of the rewind and the spring belt 36 is relatively stiff so that a driving torque is applied to spindle 13 which is greater than the take-up torque on spindle 14 so that it will overcome it during rewind operation.

Large pulley 35 is slidably mounted on sprocket shaft 15' to selectively bring a clutch element 37 on the inner face thereof into and out of engagement with a clutch element 38 on the face of driver member 19, see Fig. 2. When large pulley 35 is clutched to driver 19, and driver 19 is being rotated in a clockwise direction for forward or rewind operation of the projector, then the belt drive for the supply spindle is driven at high speed and with a relatively high torque for rewind purposes. If on the other hand the large pulley 35 is slid outwardly on sprocket shaft 15' to declutch it from driver member 19 then the belt drive to the supply spindle 13 is freed for take-up operation. For conveniently shifting the large pulley 35 between its clutched and unclutched positions, a manually operated shifting mechanism is provided. As shown in Figs. 2 and 3 this shifting mechanism comprises a grooved collar 39 fixed to the extreme end of an elongated hub 40 on large pulley 35 by a set screw 41, the groove in said collar being engaged by a vertical arm 42 fixed to, and extending downwardly from, an L-shaped shift lever 43 slidably or pivotally mounted on the projector casing to move between a rewind position shown in Fig. 3 and a take-up position shown in Fig. 2. The shift lever 43 includes a finger piece 44 which extends to the outside of the casing and which is gripped to shift the clutch. When the lever is moved to the left, see Fig. 3, the large pulley 35 is slid to the left on sprocket shaft 15' to a clutched condition with driver 19 for rewind. In this position the finger piece 44 extends into the normal path of the film and warns the operator that the projector is set for rewind, this feature being shown in U. S. Patent 2,193,031, March 12, 1940. When the lever 43 is moved to the right, see Fig. 2, the large pulley 35 is declutched from driver 19 and the drive for the supply spindle is freed for take-up or reverse operation. It will be noticed that in this position the finger piece 44 is removed from the film path to permit threading or normal movement of the film through the projector. The arm 42 is resilient and its lower end bears against a stud 45 fixed in the projector casing to produce leverage on the shift lever. The upper edge of the shift lever is provided with two notches 46 and 47 which are adapted to engage a spring detent 48 to frictionally hold the lever in either of its two positions and to indicate by feel when the lever is completely shifted to either of its positions.

Coming now to the problem of driving the spindles 13 and 14 for reverse projection, such operation requires that the film be moved backward through the same path and at the same speed as when moved for forward projection. This means that the drive for the take-up spindle must be freed so that the sprocket 18 can pull film directly therefrom and requires the supply spindle to be driven in the same direction it is for rewind but at a much slower speed and with much less driving torque lest the film being pulled from sprocket 15 by the supply reel will be tensioned to the point of breaking the film or tearing out its perforations.

These conditions are adequately met in the present spindle driving mechanism by providing an auxiliary slip drive for the supply spindle in reverse operation which drives the supply spindle at a slower speed and with less driving torque than the rewind drive, this reverse drive being constructed so that it is automatically effective when, and only when, the film feeding mechanism of the projector is set for reverse operation. This auxiliary drive for reverse operation comprises a first pulley 50 fixed to the sprocket shaft 18' by a set screw 51, a pulley 52 rotatably mounted on the hub of large pulley 35 and a resilient spring belt 53 connecting the two. Pulley 50 is the driving member of this auxiliary drive and since it is fixed to sprocket shaft 18' it will tend to drive all of the time and in the direction dictated by the driver member 20. A one-way clutch is provided between pulley 52 of the auxiliary drive and the large pulley 35 of the belt drive for the supply spindle so that this auxiliary drive will be connected to and drive pulley 35 only when the film feeding mechanism of the projector is set for reverse operation and in which case driver member 20 is rotating clockwise. This one-way clutch is again shown as a pawl and ratchet type and comprises a ratchet 55 on the periphery of a flange on pulley 52 and a double-ended pawl 56 loosely pivoted on the face of large pulley 35 to cooperate therewith. Now when the projector is set for reverse operation, and driver member 20 is rotating clockwise and large pulley 35 is declutched from driver member 19, then pulley 52 of the auxiliary drive will pick up the pawl 56 and drive the large pulley 35 which will in turn drive the supply spindle 13 through belt 36 and pulley 34. In order to obtain the slow drive for the supply spindle 13 in reverse operation the belt 53 of the auxiliary drive is made much weaker than belt 36 as the result of which the auxiliary drive will have a greater slip than the direct rewind belt drive and hence transmit less driving torque to the spindle for reverse operation than the rewind belt drive will for rewind purposes. This difference in strength of belts 36 and 53 is indicated in Fig. 1 where a small portion of each belt is drawn in to show the spacings of the spring convolutions. It will be apparent that since the auxiliary belt drive is the power source for the rewind belt drive in reverse operation, the slip characteristics of this auxiliary drive and the torque it is able to transmit will determine the torque applied to the supply spindle even though it works through the rewind belt drive including belt 36. When the mechanism is set for take-up or rewind operation and driver member 20 is rotating counter clockwise, then the ratchet 55 of the auxiliary drive will be rotating counter clockwise and will not pick up pawl 56 to drive large pulley 35.

By way of summary, the operation of the disclosed spindle drives for a motion picture projector will be briefly described for each condition of operation.

In forward operation of the projector mechanism: Finger piece 44 of clutch shift lever 43 is pushed in (see Fig. 2), large pulley 35 and the parts carried on its hub is moved to disengage clutch elements 37 and 33 so that pulley 35 is not driven, pawl 29 on driver 20 engages ratchet 28 and drives take-up spindle through belt 27. Belt 53 of the auxiliary drive is driven from sprocket shaft 18' but ratchet 55 does not engage pawl 56 on large pulley 35.

In reverse operation of the projector mechanism: Finger piece 44 of clutch shift lever 43 is pushed in and large pulley 35 is declutched from driver member 19. The film driving through the lower reel on take-up spindle 14 and belt 27 will drive pulley 26 but the ratchet 28 will not engage pawl 29 since its speed is slower. Belt 53 drives the ratchet 55 clockwise to engage the pawl 56 and drive large pulley 35 which in turn drives the supply spindle 13 through the belt 36. Belt 53 is in effect a slipping clutch which supplies the driving torque for reverse take-up.

In rewind operation of the projector mechanism: Finger piece 44 of the clutch shift lever 43 is pulled out (see Fig. 3) and large pulley 35 is clutched to driver member 19 and drives supply spindle 13 directly through belt 36 which is in effect a slipping clutch supplying the driving torque for rewind. Belt 53 of the auxiliary drive is driven but upper ratchet 55 does not engage pawl 56 because it is rotating counterclockwise. The film, being rewound, drives the lower pulley 26 and the ratchet 28 will engage the pawl 29. The belt 27 must slip thereby putting a drag on the take-up spindle 14 which results in a tight rewound reel.

Referring now to Fig. 4, it will be pointed out that the present invention is not limited to use in combination with a projector having a film path necessitating the driver members 19 and 20 being rotated counter to one another but will operate satisfactorily, and with practically the same efficiency, in combination with projectors having a film path necessitating the driver members 19 and 20, or their equivalent, rotating in the same direction. Such a condition will exist if the film is passed under sprocket 15, rather than over it as in the previously described embodiment, for then both the sprocket 15 and sprocket 18 will have to be rotated clockwise in feeding the film for forward projection and counterclockwise for reverse projection. Such film paths are conventional as exemplified in the disclosure of U. S. Patent 2,000,286 which is representative of many known projectors having a film path of this character.

A film path of this character can be accommodated by modifying the disclosed projector drive so as to simultaneously rotate the drivers 19 and 20 in one and the same direction for forward projection and in the other and same direction for reverse and rewind operation. There are any number of ways in which this may be accomplished, but in order to show one which requires the least modification in the drive already disclosed I have shown the worm wheel drivers 19 and 20 as spur gears 19' and 20' driven by a pinion 100. This pinion can be connected to, and driven by, a reversible motor, not shown, the same as worm 21 was in the disclosed embodiment. Since the remainder of the reel spindle drive in this embodiment remains the same as that in the previously disclosed embodiment the same parts have been referred to by the same reference characters.

Looking now at Fig. 4, since the take-up spindle 14 and sprocket 18 must rotate in the same directions for forward direction as in the first disclosed embodiment, this means that the driver 20' must rotate in a counterclockwise direction, as indicated by the labelled arrow, for forward operation. It follows then that the driver 19' must also rotate in the same direction as indicated by the labelled arrow for this drive condition as dictated by the new spur gear and pinion drive. It will be noticed that so far as driver 19' is concerned, this direction of rotation is opposite to that it had under the same condition of drive in the first disclosed embodiment.

Now for the reverse and rewind operations of the projector it is the direction of rotation of supply spindle 13 which is critical since the reel thereon must be driven in a direction to wind up the film. This means that driver 19' must rotate in a clockwise direction for both of these conditions, as indicated by the arrows, and this is accomplished by reversing the motor driving the pinion 100. This necessarily means that the driver 20' will be rotated in a clockwise direction at these times. While this corresponds to the direction in which driver 20 was driven in the first embodiment during reverse operation, it is opposite to the direction it was driven during rewind operation. For this reason one might expect that the drag feature introduced by the tendency drive on the take-up spindle during rewind in the first embodiment would be lost but this is not entirely true as will now be pointed out. At the start of the rewind operation the pawl 29 of the one way clutch will move clockwise and will not pick up ratchet 28 so that there will be no drive, and hence no drag, on the take-up spindle during rewind except that introduced by the inherent friction in the tendency drive for the take-up spindle. However, in a short time after rewind has been started, the diameter of the coil on the supply reel will build up to a diameter such that the film being pulled from the take-up reel will, through the belt drive 27, tend to drive the ratchet 28 clockwise at a speed in excess of that at which pawl 29 and driver 20' is being directly driven in this direction. As soon as this condition of relative speeds exists nose 31 of pawl 29 will engage ratchet 28 and place a mechanical hold back on the speed at which take-up spindle can be rotated in a counterclockwise direction. This will result in a drag being placed on the film strip to insure a tightly wound supply reel, the slip of the belt drives for the two spindles insuring that the film strip cannot be subjected to a rupturing stress.

In the forward and reverse direction of operation this form of drive in combination with the present invention acts the same as in the first disclosed embodiment. While in the forward direction of operation the driver 19' is rotating in a direction opposite to that in which driver 19 was operating on the first embodiment, this is of no import since drive pulley 35 of the belt drive for the supply spindle is declutched from driver 19' by movement of clutch lever 43 to its "in" position shown in Fig. 2 where its finger piece 44 is removed from the film path. In the reverse condition of operation the driver 20' will be operating in the same direction as driver 20 was with the result that the auxiliary tendency drive including belt 53 and pulleys 50 and 52 will be moving in a counter clockwise direction. As a result of this ratchet 55 will pick up wall 56 to drive pulley 35 and hence supply spindle 13 in a counter clockwise direction, it being understood that pulley 35 is declutched from driver 19' at this time.

A driving mechanism constructed in accordance with the present invention is practically foolproof in operation. The dependence of the different drive conditions upon a pair of particularly arranged one-way clutches makes it impossible to inadvertently get the direction of the drives on the two spindles 13 and 14 in opposition to one another. The only difficulty which might possibly be encountered in setting up the proper respective drive conditions would be to inadvertently operate shift lever 43 and clutch the large pulley 35 to driver member 19 or 19' to set up a rewind condition when the projector mechanism was operating in the reverse direction or, through operating in the forward direction, had the film threaded through the projector. This inadvertent operation is prevented, however, by arranging the shift lever 43 so that finger piece 44 thereof will move into the normal film path of the projector when this lever is shifted to a rewind position. If a film is threaded through the projector, as it will be for forward or reverse operation, then lever 43 cannot be shifted to a rewind position without purposely deflecting the film from its path.

While I have shown the two spindle drives and auxiliary drives in the form of belt drives it is pointed out that these could be replaced by any form of tendency or slip drive, including gear drives having as a part thereof slipping clutches, fluid couplings, etc., without going beyond the scope of the present invention.

Although I have shown and described certain specific embodiments of my invention, I am fully aware that many modifications thereof are possible. My invention, therefore, is not to be limited to the specific details of construction shown and described but is intended to cover all modifications coming within the scope of the appended claims.

Having thus described my invention, what I claim is new and desire to secure by Letters Patent of the United States is:

1. A reel driving mechanism for a motion picture projector capable of forward, reverse and rewind operation comprising in combination a rotatable supply spindle, a rotatable takeup spindle, means for selectively driving said supply spindle in one direction for rewind and reverse operation and leaving it free to rotate in the other direction for forward operation, a first tendency drive for said supply spindle capable of producing a given driving torque on said spindle and including a driver member and a driven member with a slippable coupling therebetween, means for selectively clutching said driven member to said driver member for rewind operation and declutching it from said driver member for reverse and forward operation, a second reversible driver member adapted to drive in one direction for forward operation and the other for reverse operation, a second tendency drive for said take-up spindle including a driver member, a driven member and a slippable coupling between the two, a one-way clutch between said last mentioned driver member of the second tendency drive and said second reversible driver member arranged to connect said driver to said driver member only when the latter is driving in a forward direction, an auxiliary tendency drive arranged to produce a driving torque which is less than said given driving torque which said first tendency drive for the supply spindle is capable of, means for connecting said auxiliary tendency drive to said second driver member to be driven thereby, and means for automatically connecting said auxiliary tendency drive to said first tendency drive to drive the same only when said auxiliary tendency drive is being driven in a direction for reverse operation and when said first tendency drive is declutched from said first driver member.

2. A reel driving mechanism for a motion picture projector capable of forward, reverse and rewind operation comprising in combination a rotatable supply spindle, a rotatable take-up spindle, means for selectively driving said supply spindle in one direction for rewind and reverse operation and leaving it free to rotate in the other direction for forward operation and comprising a first driver member, a belt drive for said supply spindle capable of producing a given driving torque on said spindle and including a drive pulley, a driven pulley fixed to said supply spindle and a belt connecting the two pulleys, means for selectively clutching said drive pulley to said driver member for rewind operation and declutching it from said driver member for reverse and forward operation, a second reversible driver member adapted to drive in one direction for forward operation and the other direction for reverse operation, a belt drive for said take-up spindle including a driven pulley fixed to said take-up spindle, a second drive pulley and a belt connecting the two pulleys, a one-way clutch between said second drive pulley and said second driver member arranged to connect said drive pulley to said driver member only when the latter is driving in a forward direction, a tendency drive arranged to produce a driving torque which is less than said given driving torque which said belt drive for the supply spindle is capable of, means for connecting said tendency drive to said second driver member to be driven thereby, and means for automatically connecting said tendency drive to the belt drive of said supply spindle to drive the same only when said tendency drive is being driven in a direction for reverse operation and when said belt drive is declutched from said first driver member.

3. A reel driving mechanism for a motion picture projector according to claim 2, and characterized by the fact that said last mentioned means for automatically connecting said tendency drive to the belt drive of said spindle comprises a one-way clutch between a driven member of said tendency drive and the drive pulley of said belt drive for the supply spindle.

4. A reel driving mechanism for a motion picture projector according to claim 2, in which said tendency drive is a belt drive including a drive pulley positively connected to said second driver, a driven pulley rotatable relative to the drive pulley of said belt drive for the supply spindle and a belt connecting said two pulleys, said belt being weaker and capable of more slip on its pulleys than the belt of said supply spindle belt drive so as to be capable of delivering less driving torque than said supply spindle belt drive.

5. A film take-up, reversing and rewind driving mechanism for a motion picture projector comprising in combination a rotatable supply spindle, a rotatable take-up spindle, means for selectively driving said take-up spindle and cutting the drive off from said supply spindle for take-up purposes and for selectively applying a given driving torque to said supply spindle for rewind operation and a lower driving torque for reverse operation, said last mentioned means including a pair of driver members, reversible means for simultaneously driving said driver members counter to one another in one sense for forward and rewind operation and in the other sense for reverse operation, a first tendency drive for said supply spindle capable of applying a given driving torque to the supply spindle for rewind purposes, means for selectively positively connecting said tendency drive to one of said driver members for rewind operation and disconnecting it therefrom for forward and reverse operation, a second tendency drive capable of applying less driving torque than said first tendency drive and including a member driven by said other driver member so that the direction of said second tendency drive is dependent upon that of said other driver member, and means for positively connecting said second tendency drive to said first tendency drive to drive the same for reverse operation and including a one-way clutch between the two tendency drives which is arranged to connect said two drives only when said driver members are driving in a sense necessary to reverse operation.

6. A film take-up, reversing and rewind driving mechanism for a motion picture projector according to claim 5, in which the means for driving said take-up spindle comprises a third tendency drive capable of applying a certain driving torque to the take-up spindle, a one-way clutch between a member of said third tendency drive and said other drive member adapted to positively connect said drive to said driver member when the latter is rotating in a sense necessary for take-up and rewind operation, and in which said first tendency drive for driving said supply spindle is so constructed that the given driving torque of which it is capable of transmitting to said supply spindle is greater than said certain take-up torque since it must overcome it during rewind operation.

7. A film take-up, reversing and rewind driving mechanism for a motion picture projector according to claim 5, in which each of said tendency drives comprises a pair of pulleys connected by a resilient belt, the belt of the first tendency drive directly connected to the supply spindle having a greater stiffness than the belt of said second tendency drive whereby the latter will produce less driving torque before it slips.

8. A film take-up, reversing and rewind driving mechanism for a motion picture projector comprising in combination a rotatable supply spindle, a rotatable take-up spindle, means for selectively driving said take-up spindle and cutting the drive off from said supply spindle for take-up purposes and for selectively applying a given driving torque to the supply spindle for rewind operation and a lower driving torque for reverse operation, said last mentioned means including a pair of rotatable driver members, selectively reversible means for rotating said driver members simultaneously in counter directions and in one sense for forward and rewind operation and in the opposite sense for reverse operation, a belt drive for the supply spindle comprising a small pulley fixed to the spindle, a larger pulley rotatably mounted relative to and adjacent one of said driver members, and a spring belt connecting said pulleys, means for selectively clutching the larger pulley to its adjacent driver member for rewind operation when said driver member is rotating in the proper sense for rewind operation and for selectively declutching said larger pulley from said driver member for forward and reverse operation, a belt drive for said take-up spindle comprising a pulley fixed to said take-up spindle, a free running pulley adjacent said other driver member and a belt connecting the two, said belt drive adapted to produce less driving torque on the take-up spindle than that produced by the belt drive for said supply spindle, a one-way clutch between said free running pulley of the take-up belt drive and said other driver member arranged so that when said driver member is rotating in a direction for rewind and forward operation said pulley is clutched to and driven by said driver member, an auxiliary belt drive for driving said large pulley and hence the supply spindle during reverse operation comprising a pulley fixed to and rotated by said other driver member, a free-running pulley coaxial with and adjacent said first driver member, a resilient belt weaker than said resilient belt of the supply spindle drive connecting said pulleys, and a one-way clutch between said large pulley and the adjacent pulley of said auxiliary belt drive arranged to connect the two belt drives only when said driver members are rotating in a sense to produce reverse operation, whereby the auxiliary belt drive having the lesser driving torque becomes the prime mover for the supply spindle.

9. A film take-up, reversing and rewind driving mechanism for a motion picture projector comprising in combination a rotatable supply spindle, a rotatable take-up spindle, means for selectively driving said take-up spindle and cutting the drive off from said supply spindle for take-up purposes and for selectively applying a given driving torque to the supply spindle for rewind operation and a lower driving torque for reverse operation, said last mentioned means including a pair of parallel shafts, means for rotating said shafts simultaneously in counter directions in one sense for forward and rewind operation and in the other sense for reverse operation, and including a selectively reversible driving member, a belt drive for said supply spindle including a small pulley fixed to said spindle, a large pulley rotatably mounted on one of said shafts, and a spring belt connecting said pulleys, a manually-operated clutch between said large pulley and its shaft for positively connecting said large pulley to said shaft when the latter is rotating in the sense to produce rewind operation, whereby said supply spindle is driven at a high speed and at a relatively high rewind torque, a second belt drive for said take-up spindle including a pulley fixed to said takeup spindle, a pulley rotatably mounted on said other shaft and a belt between the two pulleys, a one-way clutch between said pulley on the shaft and said shaft arranged to positively connect said second belt drive to said other shaft when it is rotating in a sense to produce rewind and take-up operations, the driving ratio of said second belt drive relative to the driving ratio of said first belt drive being such that the driving torque applied to the supply spindle during rewind is greater than the driving torque applied to the take-up spindle during rewind, an auxiliary belt drive for driving said supply spindle with less torque than said rewind torque applied by said first belt drive and comprising a pulley fixed to said other shaft, a pulley rotatably mounted on said first shaft adjacent said large pulley forming a part of said first belt drive, a resilient belt connecting said two pulleys which is weaker than said resilient belt forming a part of said first belt drive, and a one-way clutch between said large pulley and said adjacent pulley forming a part of said auxiliary belt drive so arranged that it positively connects the two when said shafts are rotating in a sense commensurate with reverse operation, whereby said auxiliary drive becomes the driving means for said supply spindle.

10. A reel driving mechanism for a motion picture projector capable of forward, reverse and rewind operation comprising in combination a rotatable supply spindle, a rotatable take-up spindle, means for selectively driving said take-up spindle and cutting the drive off from said supply spindle for take-up purposes and for selectively applying a given torque to said supply spindle for rewind operation and a lower driving torque for reverse operation, said last mentioned means including a pair of driver members, reversible means for simultaneously driving said driver members in the same direction for forward operation and in the opposite direction for reverse operation, a belt drive for said supply spindle capable of applying a given driving torque to the supply spindle for rewind purposes and including a driving pulley, a driven pulley fixed to the supply spindle and a belt connecting the two, means for selectively positively clutching said driver pulley to one of said driver members for rewind operation and declutching it therefrom for forward and reverse operation, an auxiliary belt drive capable of applying less driving torque than said supply spindle belt drive and including a drive pulley connected to and driven by said other driver member, and a driven pulley, and means for automatically positively connecting said auxiliary belt drive to said first belt drive to drive the latter, and including a one-way clutch between the driven pulley of said auxiliary belt drive and the drive pulley of said supply spindle belt drive arranged to connect said two belt drives only when said driver members are driving in the direction necessary to reverse operation.

VERNON H. JUNGJOHANN.

References Cited in the file of this patent

UNITED STATES PATENTS

| Number | Name | Date |
|---|---|---|
| 1,846,004 | Green | Feb. 16, 1932 |
| 2,193,031 | Lyman et al. | Mar. 12, 1940 |